United States Patent [19]

Vanderlaan

[11] Patent Number: 5,092,178
[45] Date of Patent: Mar. 3, 1992

[54] DIFFERENTIAL PRESSURE SENSOR MECHANISMS

[75] Inventor: Robert D. Vanderlaan, Kalamazoo, Mich.

[73] Assignee: Pneumo Abex Corporation, Boston, Mass.

[21] Appl. No.: 345,117

[22] Filed: Apr. 28, 1989

[51] Int. Cl.$^5$ ............................ G01L 7/16; G01L 9/10
[52] U.S. Cl. ........................................................ 73/745
[58] Field of Search ................. 73/745, 115, 722, 714; 336/30

[56] References Cited

U.S. PATENT DOCUMENTS

| | | | |
|---|---|---|---|
| 3,383,922 | 5/1968 | Seamans, Jr. | 73/745 |
| 3,442,134 | 5/1969 | Bennett et al. | 73/745 |
| 3,453,573 | 7/1969 | Kyle | 336/30 |
| 3,492,872 | 2/1970 | Caspar et al. | 73/722 |
| 3,534,612 | 10/1970 | Buckland | 73/722 |
| 3,744,316 | 7/1973 | Kuzyk | 73/745 |

OTHER PUBLICATIONS

Pressure Transducer has Long Service Life 1981.

*Primary Examiner*—Donald O. Woodiel
*Attorney, Agent, or Firm*—Renner, Otto, Boissele & Sklar

[57] ABSTRACT

Differential pressure sensor mechanisms include core members acted upon by pressure sensing plungers at opposite ends of the core members to cause axial movement of the core members relative to a linear variable position sensor when unequal force balances are applied to the respective plungers, and centering springs for centering the core members with respect to the sensor when equal force balances are applied to the respective plungers. The centering springs desirably flex equally in both directions to keep reversing stress levels to a minimum and are essentially unloaded in the null or lower load region of operation to minimize the possibility of induced plunger side loading in the most active and critical region of performance. Carriage members desirably support opposite ends of the core members for coaxial movement relative to the sensor.

37 Claims, 5 Drawing Sheets

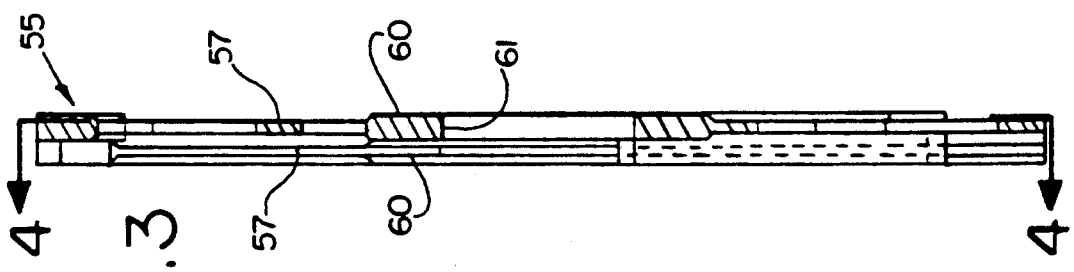
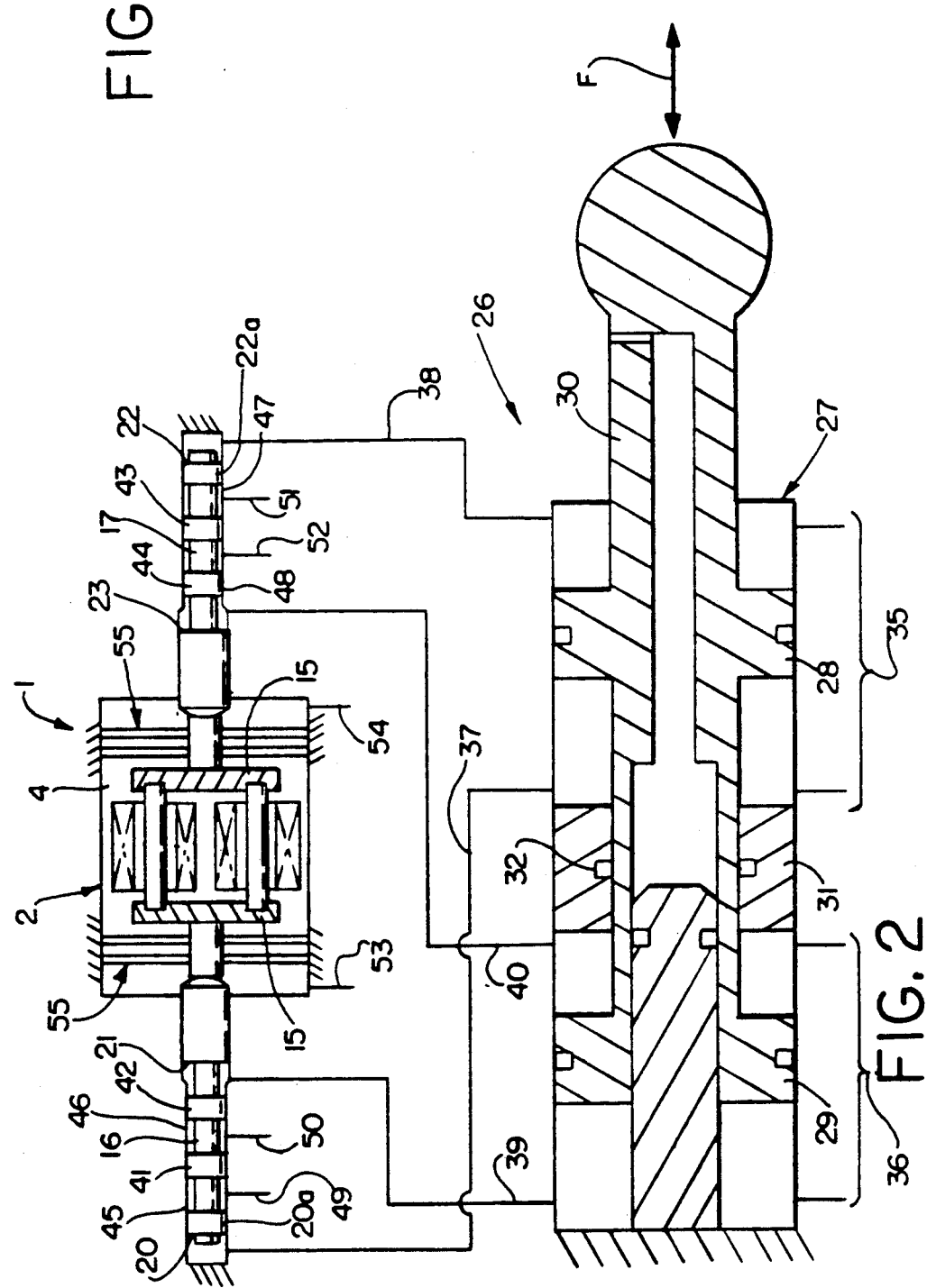

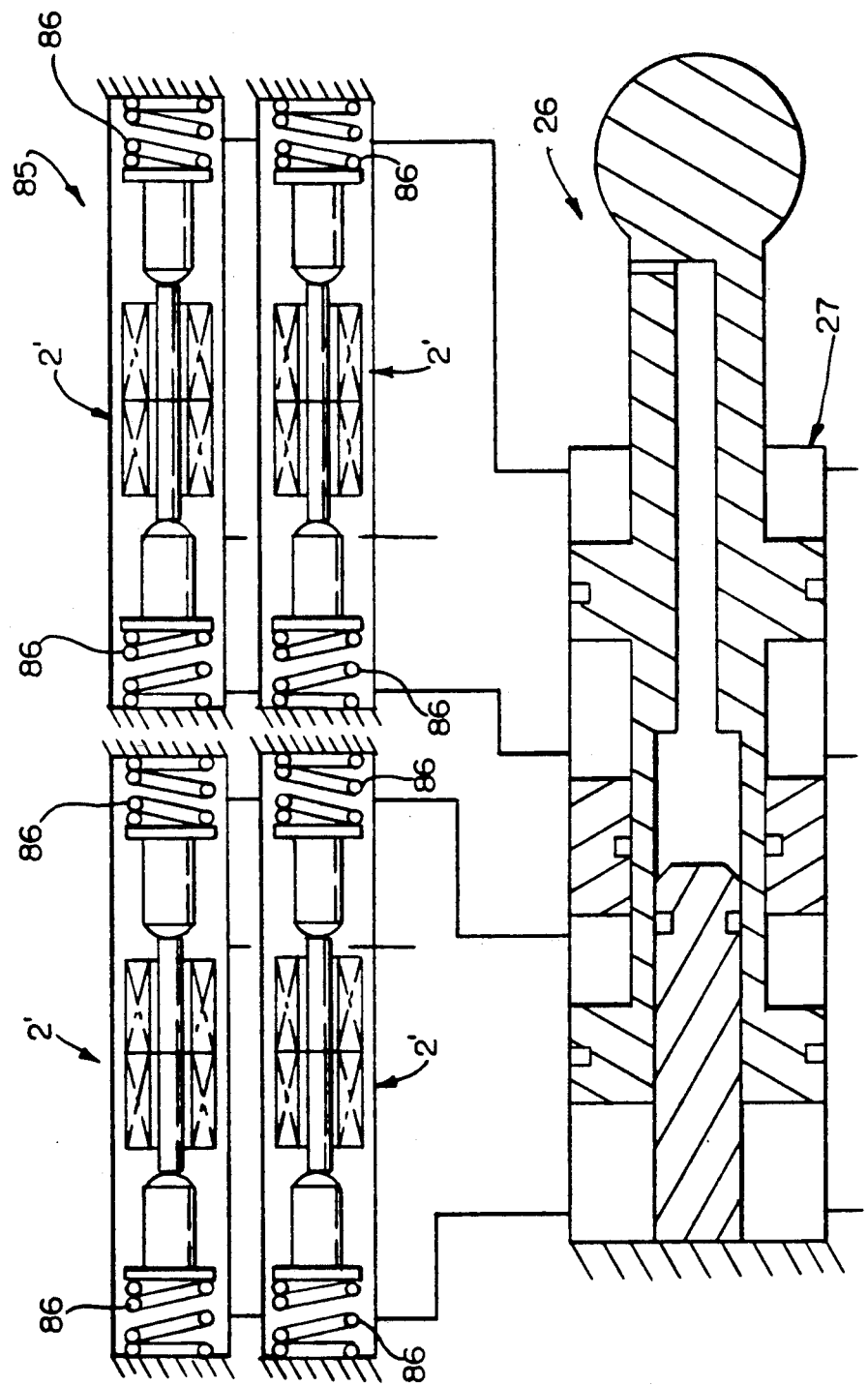

DIFFERENTIAL PRESSURE SENSOR MECHANISMS

BACKGROUND OF THE INVENTION

This invention relates generally, as indicated, to differential pressure sensor mechanisms especially intended for use in sensing actuator load information for advanced military aircraft flight control servo actuation systems and the like. Such systems may utilize increased system pressure levels of up to 8000 psi or more to reduce overall hydraulic system weight and improve efficiency, and require actuator load information for control reasons including, for example, dynamic load damping, actuator stiffness enhancement, flutter suppression, load synchronization between multiple actuators performing the same function, and system failure monitoring.

It is already known to sense actuator load by measuring cylinder pressure differences across the actuator piston or pistons and thereby infer load. This "load" information is then electrically sensed and processed by a servo loop electronic computer or the like. However, previous known high pressure sensors have had undesirable aspects that include strain gauges requiring electronic components to amplify signal levels, excessive friction from mechanically sliding parts such as loosely guided linear variable differential transformer (LVDT) quills or cores, mechanically induced side load friction caused by off center or out of square spring loading, and other mechanisms that are vibration sensitive.

SUMMARY OF THE INVENTION

With the foregoing in mind, it is a principal object of this invention to provide relatively simple and reliable differential pressure sensor mechanisms for determining the load (or output force) on a fluid actuator by measuring the pressure differential across the actuator piston or pistons.

Another object is to provide such differential pressure sensor mechanisms for determining the load on a tandem (dual hydraulic system) actuator regardless of whether the actuator is supported by one or both hydraulic systems.

Still another object is to provide differential pressure sensor mechanisms for determining actuator load on a tandem actuator which has unequal piston areas (i.e., an unbalanced actuator or actuator with different system sizes) by hydraulically adding the two actuator system effects together accurately to represent the external load.

Yet another object is to provide such differential pressure sensor mechanisms which will structurally accept very high system pressure loads of up to 8000 psi or more without reducing output signal level and without added risks of rupture.

Another object is to provide such differential pressure sensor mechanisms with multiple electrical output signals for system redundancy.

Still another object is to provide such differential pressure sensor mechanisms that produce an adequate electrical signal level without the need for signal amplification electronics.

A further object is to provide such differential pressure sensor mechanisms that utilize a linear variable position sensor such as a linear variable differential transformer (LVDT) as an electrical transmitter to provide adequate output signal level without electronic amplification, thus eliminating the need for having to place other electrical components in the hostile actuator thermal and vibrational environment.

Still another object is to provide such differential pressure sensor mechanisms that detect the movement of displaced pressure sensitive plungers through a structural wall that will readily support substantial system pressure levels of up to 8000 psi or more without deformation or threat of failure.

Another object is to provide such differential pressure sensor mechanisms which support the movable core or cores of a single or multiple linear variable position sensor transmitter without the possibility of contacting adjacent structure and causing friction and associated hysteresis.

A further object is to provide such differential pressure sensor mechanisms with a transmitter core or cores arranged so that all motion is in line and the only sliding surfaces involved are very precisely lap fitted plunger assemblies having extremely low levels of sliding friction.

Still another object is to provide such differential pressure sensor mechanisms that are fully symmetrical, end for end, so that all tendencies for null shift with thermal or pressure changes are eliminated.

Another object is to provide such differential pressure sensor mechanisms with a unique support system for the linear variable position sensor core elements that ensures substantially contact free motion under all conditions of shock vibration in any direction and adequate stiffness in lateral planes to eliminate side loading on the pressure sensing plungers.

A further object is to provide such differential pressure sensor mechanisms with spring centering mechanisms for the pressure sensing plungers which produce the very high spring rate necessary to support the differential forces acting on the plungers in a relatively small package without inducing plunger side loading.

A further object is to provide such differential pressure sensor mechanisms with spring centering mechanisms which do not require preloading, thereby reducing the possibility of inducing undesirable plunger side loading.

Still another object is to provide such differential pressure sensor mechanisms with spring centering mechanisms that flex equally in opposite directions, thereby minimizing reversing stress levels.

Yet another object is to provide such differential pressure sensor mechanisms with spring centering mechanisms that are essentially unloaded in the null or lower load region of operation, thereby minimizing the possibility of induced plunger side loading in the most active and critical region of performance of the differential pressure sensor.

Still another object is to provide such differential pressure sensor mechanisms which in one form of the invention include spring centering mechanisms comprised of multiple flat disk-like elements each having multiple flexure paths such that in-line motion without angularity will be substantially insured and redundancy against fracture will be provided with minimum signal degradation and without the threat of catastrophic failure.

Another object is to provide such differential pressure sensor mechanisms with a very high natural frequency (i.e., greater than 1000 Hz) by virtue of their relatively small moving mass and relatively high spring rate.

Still another object is to provide such differential pressure sensor mechanisms with relatively low fluid volume under compression so that their dynamic response range will be extended.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 2 is a schematic illustration of a servo actuation system including a differential pressure sensor mechanism of the type shown in FIG. 1 connected to a dual tandem piston actuator for sensing actuator load regardless of whether the actuator load is supported by one or both hydraulic systems;

FIG. 3 is an enlarged fragmentary longitudinal section through one form of centering spring for use with the differential pressure sensor mechanisms of the present invention, taken along the plane of the line 3—3 of FIG. 4;

FIGS. 6 and 7 are schematic illustrations of servo actuation systems including two other forms of differential pressure sensor mechanisms in accordance with this invention shown sensing actuator loads on a dual tandem piston actuator.

DETAILED DESCRIPTION OF THE PREFERRED EMBODIMENTS

Figure 1:
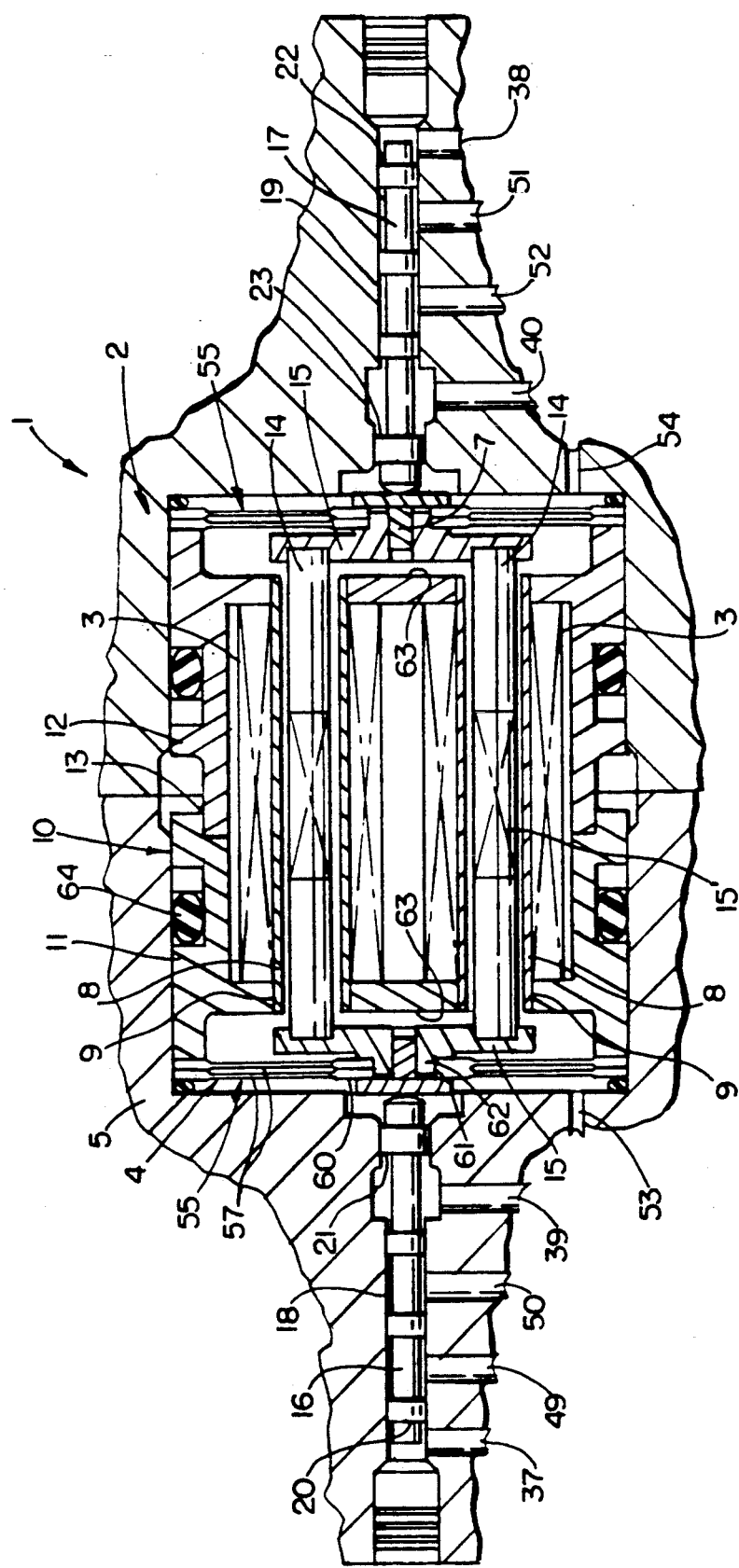
FIG. 1 is a fragmentary longitudinal section through a preferred form of differential pressure sensor mechanism in accordance with this invention.

Referring now in detail to the drawings, and initially to FIG. 1, there is shown one form of differential pressure sensor mechanism 1 in accordance with this invention which is primarily intended for use with multiple redundant aircraft flight control servo actuation systems. Multiple redundancy implies separate and independent hydraulic systems and multiple electronic control channels in the aircraft, so that in the event one of the hydraulic systems or electronic control channels should fail or shut down, the other still functioning hydraulic system and electronic control channels may still be operated to effect the desired position control function. However, it should be understood that the various differential pressure sensor mechanisms of the present invention also equally apply to simplex systems including a single hydraulic system.

As schematically shown in FIG. 1, the differential pressure sensor mechanism 1 includes a linear variable position sensor such as a linear variable differential transformer (LVDT) or equivalent linear position sensor 2 which may have dual, triplex or quad outer coils 3 to provide multiple electrical output signals for system redundancy. The sensor 2 is received in a chamber 4 of a surrounding body member 5. Outer coils 3 are wound on one or more bobbins 8 received in bores 9 in the sensor housing 10. Housing 10 may be made in two sections 11, 12 and welded or otherwise secured together as at 13. Coaxially slidably received within the bobbins 8 are core elements 14 which are desirably supported at opposite ends by carriage members 15 suitably keyed to the respective housing sections 11, 12 at 7 to assure coaxial alignment and prevent rotation, thereby eliminating contact with adjacent structure and the associated friction and hysteresis. The movable coils 15' of the sensor 2 are wound on the core elements 14 and move with them, whereby core motion is converted to an electrical signal at the sensor output in a manner well known in the art.

At opposite ends of the sensor core carriages 15 and in coaxial alignment therewith are respective pressure sensing plungers 16, 17 contained in respective bores 18, 19 in the body member 5 communicating with opposite ends of the chamber 4. Each plunger 16, 17 includes one or more surface areas 20, 21 and 22, 23 which are exposed to the fluid pressure acting on opposite sides of one or more actuator pistons of a single or dual redundant servo actuation system or the like.

If only a single hydraulic system is provided for controlling the movements of a single actuator piston, each plunger 16, 17 need only be provided with a single surface area 20, 22 exposed to the fluid pressure acting on opposite sides of the actuator piston. However, if a dual hydraulic system is provided for controlling the movements of a dual actuator piston, each sensor plunger 16, 17 is provided with two separate isolated surface areas 20, 21 and 22, 23, one surface area 20, 22 of each plunger 16, 17 being exposed to the fluid pressure acting on opposite sides of one of the actuator pistons, and the other surface area 21, 23 of each plunger being exposed to the fluid pressure acting on opposite sides of the other actuator piston. Moreover, the respective surface areas 20, 22 and 21, 23 exposed to the fluid pressure acting on opposite sides of the respective actuator pistons may be equal for a balanced area actuator or unequal for an unbalanced area actuator or for an actuator with areas that differ for the two hydraulic systems as related to the actuator piston area ratios. In this way, the differential pressure sensor mechanism 1 will accurately measure the true actuator load by measuring the actuator cylinder pressures.

FIG. 2 schematically shows a conventional dual redundant servo actuation system 26 including a dual tandem piston actuator 27 having a pair of pistons 28, 29 connected to a common output rod 30 for common movement therewith. Between the two pistons 28, 29 is a center dam portion 31 having a dynamic seal 32 in sliding sealed engagement with the O.D. of the piston rod 30 to isolate the two pistons 28, 29 from each other. The respective pistons 28, 29 are connected to separate and independent hydraulic systems 35, 36, whereby in the event one of the hydraulic systems should fail or shut down, the other still functioning hydraulic system may still be used to control actuator movement.

Where a dual hydraulic actuator system 26 is provided as shown in FIG. 2, the fluid pressure which is supplied to opposite sides of one of the pistons 28 from one of the hydraulic systems 35 is also supplied to one of the surface areas 20, 22 of the respective plungers 16, 17 through respective fluid passages 37, 38 extending therebetween. In like manner the fluid pressure which is supplied to opposite sides of the other piston 29 from the other hydraulic system 36 is also supplied to the other surface areas 21, 23 of the respective plungers 16, 17 through respective fluid passages 39, 40 extending therebetween.

One of the respective surface areas 20, 22 is desirably located at the outermost ends of the respective plungers 16, 17, whereas the other respective surface area 21, 23 may be formed by providing differential surface areas adjacent the inner ends of the respective plungers. Intermediate the surface areas 20, 21 and 22, 23 of the respective plungers 16, 17 are a plurality of spaced apart lands 20a, 41, 42 and 22a, 43, 44 defining a pair of grooves 45, 46 and 47, 48 therebetween having fluid passages 49, 50 and 51, 52 communicating with the fluid return reservoirs for the respective hydraulic systems 35, 36 to take care of any fluid leakage. In like manner, suitable fluid passages 53, 54 may provide communication between opposite ends of the body member chamber 4 and the fluid return reservoir for the respective hydraulic system 36 to take care of any fluid leakage into such chamber.

When the actuator 27 is in the unloaded condition, the summation of actuator cylinder pressures times their respective piston areas will result in an internal force balance. Depending on the equality of servo valve pressure synchronization and neutral pressure levels of each system at the time of manufacture, the actual pressure levels may vary from actuator to actuator for the unloaded condition. However, as long as the force of the actuator cylinder pressures acting on the respective areas of the sensor plungers 16, 17 is balanced, centering spring mechanisms 55 at opposite ends of the sensor carriages 15 will maintain the sensor cores 14 in the null position shown in FIG. 1 thus indicating that no external load exits. If, on the other hand, the actuator 27 is under a load F (see FIG. 2), a force bias exists within the sensor 2, deflecting the centering springs 55, and displacing the sensor cores 14 in proportion to the load sensed. Thus, the piston 28, 29 motion is converted to an electrical signal which is used to measure the load F by virtue of the sensor plunger 16, 17 area relationship to the actuator piston areas 28, 29.

Using a sensor 2 as an electrical transmitter for such a differential pressure sensor mechanism 1 has the advantage that it provides an adequate output signal level without electronic amplification, thus eliminating the need for placing other electrical elements in the hostile actuator thermal and vibrational environment. Moreover, the sensor 2 will readily detect movement of the displaced pressure sensitive plungers 16, 17 through a structural wall of the body member 5 that will readily support very high system pressure levels of up to 8000 psi or more without reducing output signal level and without added risk of rupture such as exists with flexing pressure diaphragms, bellows, bourdon tubes and the like, or other mechanical or material failure possibilites that may render the device ineffective or cause hydraulic fluid leakage.

If one hydraulic system 35 should fail or otherwise shut down, movements of the actuator 27 may still be controlled by the still functioning hydraulic system 36 and vice versa. However, the remaining hydraulic system 36 differential pressure effect must increase to support a given load F. In this case, the differential pressure sensor mechanism 1 still properly measures the load F by virtue of its plunger 16, 17 area relationship with the actuator piston 29 areas acted on by the still functioning hydraulic system 36. Moreover, as previously indicated, the sensor 2 preferably has redundant multiple output coils 3 so that if one or more coils should fail, the other coils will still provide the necessary electrical output signals for system redundancy.

Figure 4:
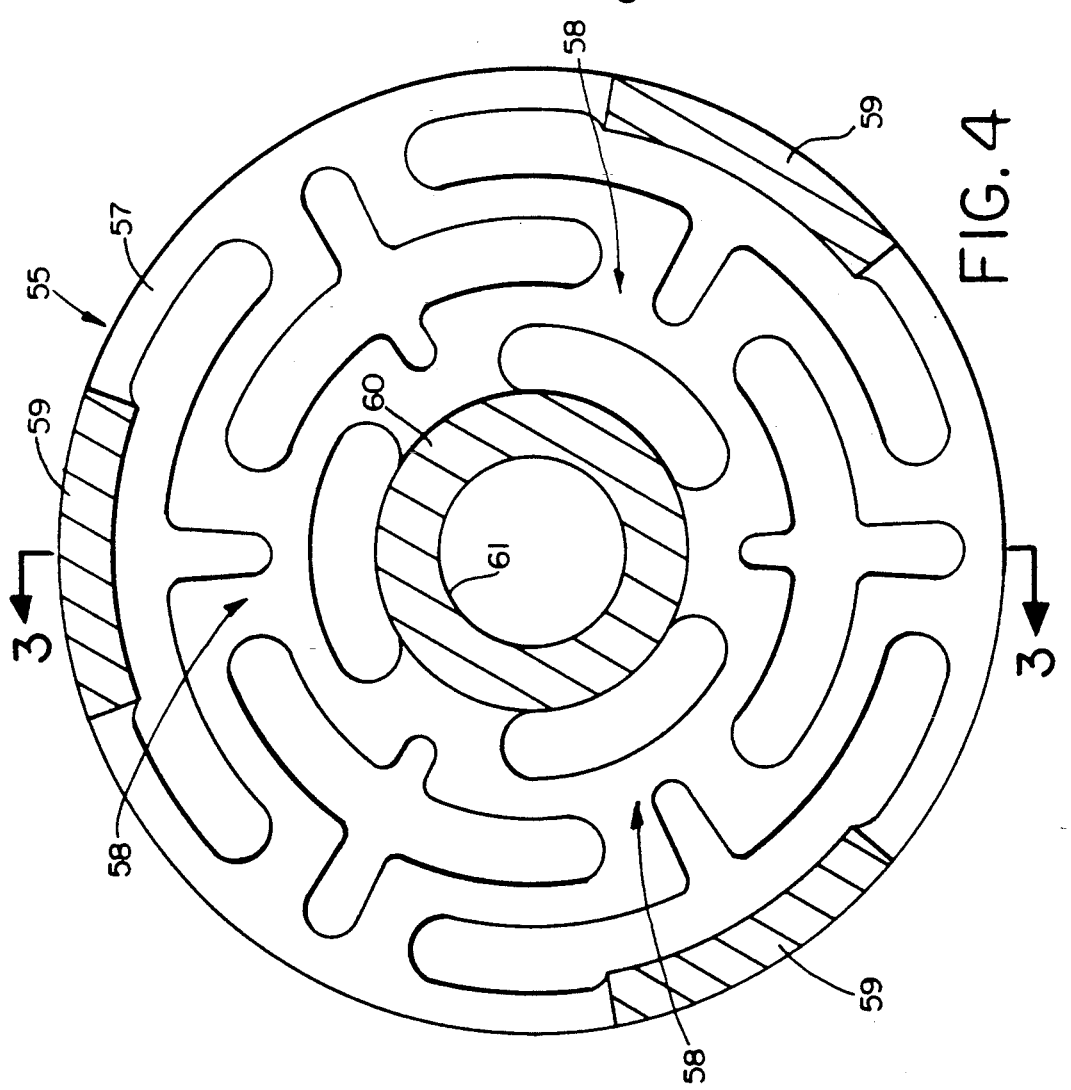
FIG. 4 is an enlarged transverse section through the centering spring of FIG. 3, taken generally along the plane of the line 4—4.

Preferably, the centering springs 55 are of a unique design including multiple flat, stamped disk-like elements 57 each having multiple flexure paths 58 such that in-line motion without angularity will be ensured and redundancy against fracture will be provided with minimum signal degradation and without the threat of catastrophic failure. As clearly shown in FIGS. 3 and 4, each spring disk 57 includes two or more flexure paths 58 for redundancy against failure, and radially outer, circumferentially spaced regions 59 of plating to build up thickness locally. Moreover, two or more such spring disks 57 are stacked together with the plated regions 59 aligned and contacting as shown in FIG. 3 to ensure proper deflection along the flexure paths 58 without surface contact slippage which may otherwise add to the friction and associated hysteresis. Also, because the spring disks 57 contact each other only in partial circumferential segments at the radially outer built-up (plated) areas 59 about the outer periphery of the disks, additional flexure length is made available at the periphery between the built-up areas 59 resulting in a smaller, more efficient flexure, thereby considerably reducing spring size for the load/rate/life requirements of the springs.

Two such spring disks 57 are shown in the desired stacked relation in FIG. 1 at each end of the sensor 2 with the O.D. of the spring disks 57 positioned between the sensor housing sections 11, 12 and the adjacent ends of chamber 4. Centrally of each spring disk 57 is an annular built-up hub area 60 containing a central opening 61 for receipt of a central bushing 62 on the respective sensor core carriages 15. Such a centering spring design 55 provides the very high spring rate that is necessary to support the differential forces produced by the sensor plungers 16, 17 in a relatively small package size without inducing any undesirable plunger side loading. Also, such a centering spring design has the further advantage that it does not require any pre-load, whereby the null or lower load region of operation of the differential pressure sensor mechanism 1 is essentially unloaded thereby minimizing the possibility of induced plunger 16, 17 side loading in the most active and critical region of performance.

Furthermore, the differential pressure sensor mechanism 1 of the present invention is desirably fully symmetrical, end for end as shown in FIG. 1, whereby all tendencies for null shift with thermal changes or pressure changes is eliminated. Moreover, the movable core elements 14 are arranged in such a way as to ensure that all motion is in-line, and the only sliding surfaces involved are the plunger 16, 17 surfaces which are very precisely lap fitted to provide extremely low levels of sliding friction. In addition, the sensor core elements 14 are supported by the core carriages 15 and centering springs 55 which ensures substantially contact free motion of the core elements 14 under all conditions of shock and vibrations and adequate stiffness in the lateral planes so that the pressure sensing plungers 16, 17 will not be required to support side loading as aforesaid.

The ends of the sensor housing sections 11, 12 act as overtravel stops 63 limiting movement of the sensor core carriages 15 and thus the core elements 14 in opposite directions. Also, fluid seals 64 may be provided between the sensor housing sections 11, 12 and adjacent chamber walls 4 to prevent fluid leakage therebetween.

Figure 5:
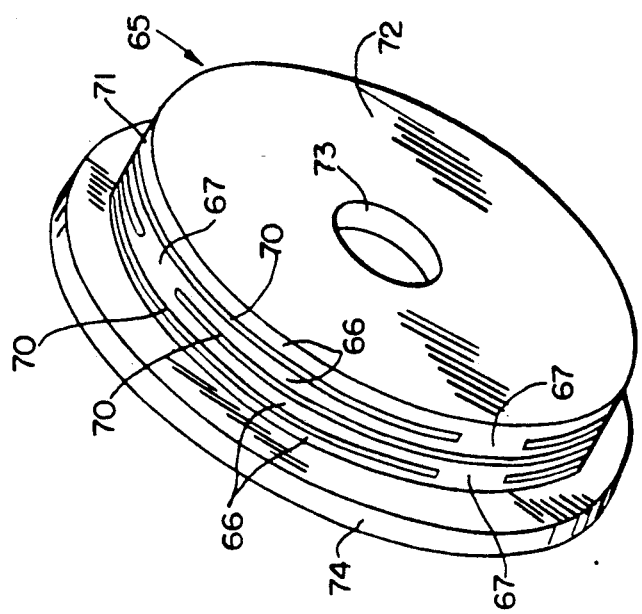
FIG. 5 is an enlarged perspective view of another form of centering spring for use with the differential pressure sensor mechanisms of the present invention.

FIG. 5 shows an alternative form of centering spring 65 in accordance with this invention which may be used in place of the centering spring 55 previously described. Centering spring 65 includes a plurality of annular spring leaves 66 in coaxially spaced relation with adjacent leaves 66 connected together at two locations 67 spaced approximately 180° apart on opposite sides of the spring and the connections 67 between adjacent pairs of leaves 66 spaced apart approximately 90° from the connections between adjacent leaves. Such a centering spring design 65 may be formed, for example, by cutting pairs of axially spaced transverse slots 70 in a spring sleeve member 71 from opposite sides thereof, leaving the connections 67 at the desired spaced apart locations. At one end of the spring sleeve member 71 is an end plate 72 having a central opening 73 therethrough for receipt of the central bushing 62 on the respective sensor core carriages 15, whereas at the other end is a radial flange 74 for engagement between the sensor housing sections 11, 12 and the adjacent ends of the body chamber 4.

Figure 6:
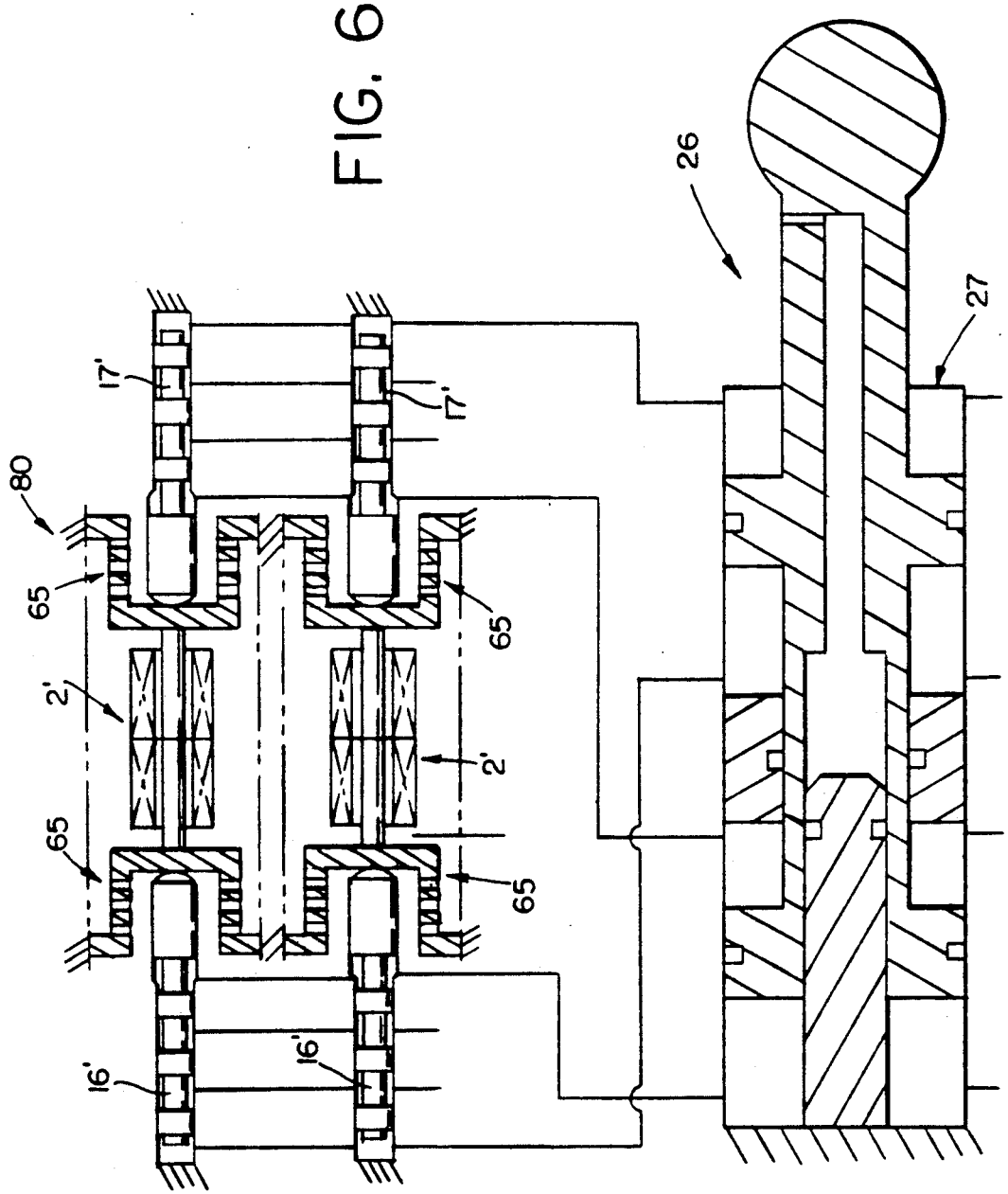

FIG. 6 schematically shows the alternative centering spring design 65 of FIG. 5 incorporated in a modified form of differential pressure sensor mechanism 80 which is substantially the same as that shown in FIGS. 1 and 2 except that two dual channel in-line sensors 2' and associated dual mechanical elements including two pairs of sensor plungers 16', 17' are provided to protect against possible failure of a spring or plunger jam for an added level of mechanical redundancy. Otherwise, the details of construction and operation of the differential pressure sensor mechanism 80 of the FIG. 6 embodiment are substantially the same as that shown in FIGS. 1 and 2, and accordingly the same reference numerals followed by a prime symbol are used to designate like parts.

FIG. 7 shows still another form of differential pressure sensor mechanism 85 in accordance with this invention which includes four dual channel in-line sensors 2' with corresponding mechanical elements similar to those previously disclosed to provide an even greater degree of mechanical redundancy. However, in this arrangement, pre-loaded compression coil springs 86 are used as the centering springs which are less desirable than the unloaded flat disk or top hat spring configurations 55 and 65 for the reasons previously discussed.

From the foregoing, it will now be apparent that the various differential pressure sensor mechanisms of the present invention provide simple and reliable means for determining the load (or output force) on a hydraulic actuator by measuring the pressure difference across the actuator piston or pistons. Also, such sensors provide a means of determining the load on a tandem (dual hydraulic system) actuator regardless of whether the actuator is supported by one or both hydraulic systems or whether the actuator is designed with equal or unequal piston areas, in that the sensors hydraulically add the two actuator system effects together to accurately represent the external load. Moreover, such differential pressure sensors have a very high natural frequency (i.e., greater than 1000 Hz) by virtue of their relatively small moving mass and relatively high spring rate, as well as a relatively low fluid volume under compression whereby their dynamic response ranges are extended.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A differential pressure sensor mechanism comprising a linear variable position sensor, core means, carriage means at opposite ends of said core means for supporting said core means for coaxial movement relative to said sensor, first and second pressure sensing plunger means in coaxial alignment with said carriage means for causing axial movement of said carriage means and thus said core means relative to said sensor whenever unequal force balances are applied to the respective plunger means, and spring means for centering said core means relative to said sensor whenever equal force balances are applied to the respective plunger means, said sensor, core means, carriage means and spring means being contained in a chamber in a body member, and said plunger means being axially slidable in bore means in said body member communicating with opposite ends of said chamber in coaxial alignment with said carriage means.

2. The sensor mechanism of claim 1 wherein said carriage means are keyed to assure coaxial alignment and prevent rotation.

3. The sensor mechanism of claim 1 wherein said sensor includes housing means surrounding said core means, said carriage means being keyed to said housing means to assure coaxial alignment and prevent rotation.

4. The sensor mechanism of claim 3 wherein opposite ends of said housing means act as overtravel stops limiting movement of said carriage means and thus said core means in opposite directions.

5. The sensor mechanism of claim 1 which is fully symmetrical, end for end, whereby null shift of said core means due to thermal changes or pressure changes is substantially eliminated.

6. The sensor mechanism of claim 1 wherein said spring means is substantially unloaded when said core means is centered with respect to said sensor, thereby reducing the possibility of inducing undesirable plunger side loading.

7. The sensor mechanism of claim 1 wherein said spring means flexes equally in opposite directions.

8. The sensor mechanism of claim 1 which comprises two in-line sensors and associated core means, carriage means, pressure sensing plunger means and spring means to protect against possible failure of a spring means or jam of a plunger means for added mechanical redundancy.

9. The sensor mechanism of claim 1 which comprises four in-line sensors and associated core means, carriage means, pressure sensing plunger means and spring means to protect against possible failure of one or more spring means or possible jam of one or more plunger means for added mechanical redundancy.

10. Differential pressure sensor mechanism comprising a linear variable position sensor, core means supported for coaxial movement relative to said sensor, first and second pressure sensing plunger means in coaxial alignment with said core means for causing axial movement of said core means relative to said sensor when unequal force balances are applied to the respective plunger means, and spring means for centering said core means with respect to said sensor when equal force balances are applied to the respective plunger means, said spring means providing a substantially zero force to said plunger means when said core means is substantially centered with respect to said sensor to reduce the possibility of inducing undesirable plunger side loading, said spring means having multiple flexure paths for redundancy against failure.

11. Differential pressure sensor mechanism comprising a linear variable position sensor, core means mounted for coaxial movement relative to said sensor, first and second pressure sensing plunger means in coaxial alignment with opposite ends of said core means for causing axial movement of said core means relative to said sensor when unequal force balances are applied to the respective plunger means, and spring means for centering said core means with respect to said sensor when equal force balances are applied to the respective plunger means, each of said plunger means having plural isolated effective surface areas exposed to fluid pressures acting on opposite sides of a plurality of pistons of a multiple redundant fluid pressure actuator.

12. The sensor mechanism of claim 11 wherein each of said plunger means has outer end areas exposed to fluid pressures acting on opposite sides of a first piston, and an intermediate differential area exposed to fluid pressures acting on opposite sides of a second piston.

13. The sensor mechanism of claim 12 wherein said outer end areas are proportional to the opposite side areas of said first piston, and said intermediate differential areas are proportional to the opposite side areas of said second piston.

14. A servo actuation system comprising an actuator having plural pistons connected to a common output shaft for common movement therewith and separate hydraulic systems for each of said pistons, whereby in the event of failure of one of said hydraulic systems, another still functioning hydraulic system will control actuator movement, and differential pressure sensor means for sensing actuator load regardless of whether the actuator load is supported by one or more of said hydraulic systems, said differential pressure sensor mechanism comprising a linear variable position sensor, core means supported for coaxial movement relative to said sensor, first and second pressure sensing plunger means in coaxial alignment with opposite ends of said core means for causing axial movement of said core means relative to said sensor when unequal force balances are applied to the respective plunger means, and spring means for centering said core means with respect to said sensor when equal force balances are applied to the respective plunger means, each of said plunger means having plural isolated effective surface areas exposed to fluid pressures acting on opposite sides of the respective pistons.

15. The system of claim 14 wherein each of said plunger means has an outer end area exposed to fluid pressures acting on opposite sides of a first piston, and an intermediate differential area exposed to fluid pressures acting on opposite sides of a second piston.

16. The system of claim 14 wherein said actuator has unequal piston areas, and said plunger means have isolated effective surface areas exposed to fluid pressures acting on opposite sides of said piston areas which are proportional to each other.

17. The system of claim 14 wherein said spring means include multiple stacked spring-like disks each having multiple flexure paths for redundancy against failure.

18. The system of claim 17 wherein said spring-like disks include radially outer, circumferentially spaced built-up areas which are in-line and contact each other to ensure proper deflection of said spring means along said flexure paths.

19. The system of claim 14 wherein said spring means comprise a plurality of annular spring leaves in coaxially spaced relation, with adjacent spring leaves being connected together at spaced apart locations.

20. The system of claim 19 wherein said adjacent spring leaves are connected together at two locations spaced approximately 180° apart, and adjacent pairs of said spring leaves are connected together at locations spaced approximately 90° from the connections between adjacent spring leaves.

21. The system of claim 14 wherein there are two in-line sensors and associated core means, pressure sensing plunger means and spring means to protect against possible failure of a spring means or jam of a plunger means for added mechanical redundancy.

22. The system of claim 14 wherein there are four in-line sensors and associated core means, pressure sensing plunger means and spring means to protect against possible failure of a spring means or jam of a plunger means for added mechanical redundancy.

23. The system of claim 14 wherein said sensor includes a plurality of outer coils which produce multiple electrical output signals for system redundancy.

24. A differential pressure sensor mechanism comprising a linear variable position sensor, core means, carriage means at opposite ends of said core means for supporting said core means for coaxial movement relative to said sensor, first and second pressure sensing plunger means in coaxial alignment with said carriage means for causing axial movement of said carriage means and thus said core means relative to said sensor whenever unequal force balances are applied to the respective plunger means, and spring means for centering said core means relative to said sensor whenever equal force balances are applied to the respective plunger means, each of said plunger means having plural isolated effective surface areas exposed to fluid pressures acting on opposite sides of plural pistons of a multiple redundant fluid pressure actuator.

25. A differential pressure sensor mechanism comprising a linear variable position sensor, core means, carriage means at opposite ends of said core means for supporting said core means for coaxial movement relative to said sensor, first and second pressure sensing plunger means in coaxial alignment with said carriage means for causing axial movement of said carriage means and thus said core means relative to said sensor whenever unequal force balances are applied to the respective plunger means, and spring means for centering said core means relative to said sensor whenever equal force balances are applied to the respective plunger means, each of said plunger means having an outer end area exposed to fluid pressures acting on opposite sides of a first piston of a multiple redundant fluid pressure actuator, and an intermediate differential area exposed to fluid pressures acting on opposite sides of a second piston of said actuator.

26. The sensor mechanism of claim 25 wherein said end areas of said plunger means are proportional to the opposite side areas of said first piston, and said intermediate differential areas are proportional to the opposite side areas of said second piston.

27. A differential pressure sensor mechanism comprising a linear variable position sensor, core means, carriage means at opposite ends of said core means for supporting said core means for coaxial movement relative to said sensor, first and second pressure sensing plunger means in coaxial alignment with said carriage means for causing axial movement of said carriage means and thus said core means relative to said sensor whenever unequal force balances are applied to the respective plunger means, and spring means for centering said core means relative to said sensor whenever equal force balances are applied to the respective plunger means, said spring means being comprised of multiple stacked spring-like disks each having multiple flexure paths for redundancy against failure.

28. The sensor mechanism of claim 27 wherein each of said spring-like disks includes radially outer, circumferentially spaced built-up areas which are aligned and in contact with each other to assure proper deflection of said spring means along said flexure paths.

29. The sensor mechanism of claim 28 wherein said spring-like disks have an annular built-up center area containing a central opening for receipt of a central bushing on said carriage means.

30. A differential pressure sensor mechanism comprising a linear variable position sensor, core means, carriage means at opposite ends of said core means for supporting said core means for coaxial movement relative to said sensor, first and second pressure sensing plunger means in coaxial alignment with said carriage means for causing axial movement of said carriage means and thus said core means relative to said sensor whenever unequal force balances are applied to the respective plunger means, and spring means for centering said core means relative to said sensor whenever equal force balances are applied to the respective plunger means, said spring means comprising a plurality of annular spring leaves in coaxially spaced relation, with adjacent leaves connected together at circumferentially spaced apart locations.

31. The sensor mechanism of claim 30 wherein said adjacent leaves are connected together at two locations spaced approximately 180° apart.

32. The sensor mechanism of claim 31 wherein adjacent pairs of said leaves are connected together at locations spaced approximately 90° from the connections between adjacent leaves.

33. Differential pressure sensor mechanism comprising a linear variable position sensor, core means supported for coaxial movement relative to said sensor, first and second pressure sensing plunger means in coaxial alignment with said core means for causing axial movement of said core means relative to said sensor when unequal force balances are applied to the respective plunger means, and spring means for centering said core means with respect to said sensor when equal force balances are applied to the respective plunger means, said spring means providing a substantially zero force to said plunger means when said core means is substantially centered with respect to said sensor to reduce the possibility of inducing undesirable plunger side loading, said spring means comprising multiple stacked spring-like disks each having multiple flexure paths for redundancy against failure.

34. The sensor mechanism of claim 33 wherein said spring-like disks include radially outer, circumferentially spaced built-up areas which are aligned and in contact with each other to ensure proper deflection of said spring means along said flexure paths.

35. The sensor mechanism of claim 34 wherein said built-up areas exist locally in two or more symmetrical regions thereby providing additional flexure length at the periphery between said built-up areas resulting in a smaller, more efficient flexure.

36. Differential pressure sensor mechanism comprising a linear variable position sensor, core means supported for coaxial movement relative to said sensor, first and second pressure sensing plunger means in coaxial alignment with said core means for causing axial movement of said core means relative to said sensor when unequal force balances are applied to the respective plunger means, and spring means for centering said core means with respect to said sensor when equal force balances are applied to the respective plunger means, said spring means providing a substantially zero force to said plunger means when said core means is substantially centered with respect to said sensor to reduce the possibility of inducing undesirable plunger side loading, said spring means comprising a plurality of annular spring leaves in coaxially spaced relation, with adjacent spring leaves being connected together at spaced apart locations.

37. The sensor mechanism of claim 36 wherein said adjacent spring leaves are connected together at two locations spaced approximately 180° apart, and adjacent pairs of said spring leaves are connected together at locations spaced apart approximately 90° from the connections between adjacent spring leaves.

* * * * *